UNITED STATES PATENT OFFICE.

WILLIAM H. H. WHITE, OF SAN FRANCISCO, CALIFORNIA.

IMPROVEMENT IN MEDICAL COMPOUNDS FOR THE CURE OF CONSUMPTION, &c.

Specification forming part of Letters Patent No. 140,329, dated June 24, 1873; application filed December 11, 1872.

*To all whom it may concern:*

Be it known that I, WILLIAM H. H. WHITE, of the city and county of San Francisco and State of California, have invented or discovered a new and valuable Remedy for Consumption and all diseases arising from colds; and I do hereby declare that the following formula and description fully describe the same.

My invention consists of a medical remedy or compound for the cure of consumption and all diseases of the human system which have their origin in a cold, such as catarrh, bronchitis, and the like.

To make my remedy, I take the leaves of the bush or shrub which is known as the "wild mountain peach," and which is found upon the Pacific coast and especially in the Sierra Nevada mountains, and dry them. After the leaves are thoroughly dried I grind them to a powder and steep the powder in a small quantity of whisky for about two weeks. I then remove the sediment or powder from the bottom of the solution and press it until all of the solution is expressed, then add black cohosh in the proportion of one-twelfth, ($\frac{1}{12}$;) sugar is then added to sweeten it to the taste, and it is then bottled for use.

This remedy should be taken three times a day and it will be found to be an effective medicine for the class of diseases above mentioned.

Having thus described my invention or discovery, what I claim is—

1. A medical extract, for the treatment and cure of consumption and other diseases arising from a cold, made from the leaves of the wild mountain peach.

2. The process above described for obtaining the extract of the wild mountain peach, for the purpose specified.

In witness whereof I hereunto set my hand and seal.

W. H. H. WHITE. [L. S.]

Witnesses:
 GEO. H. STRONG,
 C. M. RICHARDSON.